United States Patent [19]

Neff

[11] Patent Number: 4,522,374

[45] Date of Patent: Jun. 11, 1985

[54] VALVE SPOOL

[75] Inventor: James A. Neff, Bloomfield Township, Oakland County, Mich.

[73] Assignee: Mac Valves, Inc., Wixom, Mich.

[21] Appl. No.: 471,858

[22] Filed: Mar. 3, 1983

[51] Int. Cl.³ .............................................. F16K 11/18
[52] U.S. Cl. .............................. 251/356; 251/DIG. 1; 137/375; 137/625.69
[58] Field of Search .......................... 137/625.69, 375; 251/DIG. 1, 356

[56] References Cited

U.S. PATENT DOCUMENTS

| | | | |
|---|---|---|---|
| 3,342,205 | 9/1967 | Quinto | 137/375 |
| 3,670,071 | 6/1972 | Walchle et al. | 137/375 |
| 3,778,028 | 12/1973 | Graves et al. | 137/375 |
| 4,453,565 | 6/1984 | Neff | 137/625.69 |

Primary Examiner—A. Michael Chambers
Attorney, Agent, or Firm—Robert G. Mentag

[57] ABSTRACT

A sliding valve spool and method of making the same for a directional, reversing flow control air valve, such as a four-way valve, a three-way valve, a two-way valve, and the like. A plurality of annular valve members and a pair of annular centering seals are integrally molded on a valve body, in a single molding operation and which function to maintain the center position of the valve spool during use of the same in a valve spool bore in an air valve, and which also provide a sealing function with said bore. The outer, equal diameter peripheries of the molded valve members and the molded annular centering seals are simultaneously ground together with an annular pressure seal groove adjacent each of the annular centering seals.

6 Claims, 7 Drawing Figures

VALVE SPOOL

TECHNICAL FIELD

This invention relates generally to the valve art, and more particularly, to an improved sliding valve spool for an air valve, and a method of making the same. The sliding valve spool includes a plurality of molded annular valve members in combination with a pair of suitable annular pressure end seals, such as O-rings, U cups, and the like, and a pair of molded annular centering end seals. The sliding valve spool of the present invention is adapted to be used in various types of directional flow control valves, such as four-way valves, three-way valves, two-way valves and the like, for controlling the flow of pressurized air to and from various apparatuses, such as an air cylinder, an air brake, a press clutch, or any other device requiring speedy and precise control of large volumes of operating air.

BACKGROUND ART

It is known in the air valve art to provide sliding valve spools for directional flow control air valves, and to mold individual annular end seals on the sliding valve spools, as well as to mold individual annular valve members on the sliding valve spools. A disadvantage of the prior art molded sliding valve spools is that they are not stable, due to side loading. The prior art molded sliding valve spools are provided with annular pressure seal grooves machined in each end of the metal spool body. A disadvantage of such prior art molded sliding valve spools is that the tolerance of the annular pressure seal grooves cannot be held to a close dimension so that the annular pressure seals carried in such machined grooves are stable, so as to resist side loading on the valve spools. U.S. Pat. No. 2,782,801 illustrates a sliding valve spool which has molded annular valve members, and wherein the valve spool is provided with a pair of detachably mounted annular end seal members which are mounted in grooves that are machined around the periphery of the valve spool body. A disadvantage of the sliding valve spool illustrated in the last mentioned patent is that each of the annular end seal members sits in an annular groove which is machined in the valve spool body and which permits the seal to float to a certain extent. The seal has flexibility and it is not possible to hold a very close tolerance of the dimension of the seal groove formed around the periphery of the valve spool by a machining operation, so as to prevent transverse or side loading on the sliding valve spool, whereby the entire sliding valve spool moves transversely or sidewardly, relative to its longitudinal axis, due to side loading.

DISCLOSURE OF THE INVENTION

In accordance with the present invention, a molded sliding valve spool is provided for use as the master valve spool in a directional, reversing flow control valve, such as a four-way valve, a three-way valve, a two-way valve, and the like. The molded sliding valve spool includes an elongated valve spool shaft body which has molded thereon a plurality of annular valve members, and a molded annular centering seal on each end of the valve spool shaft body. An annular pressure seal, such as a U cup seal, an 0-ring seal, and the like, is mounted on each end of the valve spool shaft body in an annular seal groove which is ground to a close tolerance in the molded material simultaneously with the grinding to shape of the annular valve members and the centering seals. The annular centering seals are formed with a selective outer peripheral shape as, for example, the outer periphery of each of these centering seals may have a rounded cross section shape, a conical or pointed cross section shape, or a flat cross section shape.

BEST MODE OF CARRYING OUT THE INVENTION

Figure 3:
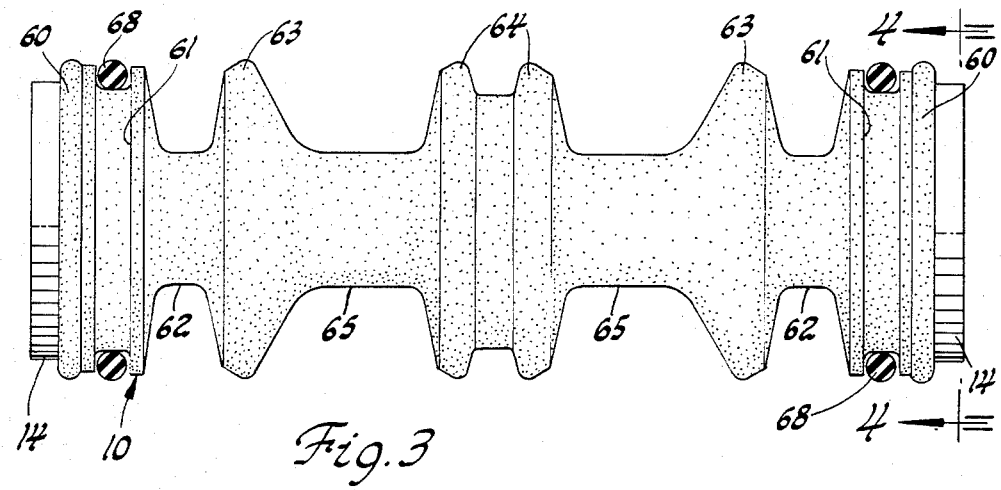
FIG. 3 is a side elevational view of a finished sliding valve spool made in accordance with the principles of the present invention, and ready for mounting in a directional, reversing flow control valve.
Figure 4:
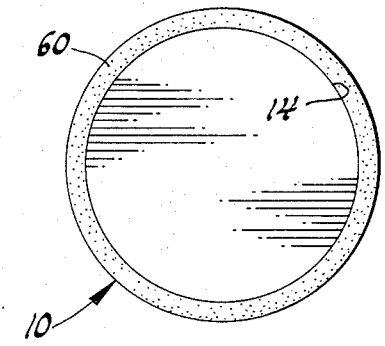
FIG. 4 is a right end view of the sliding valve spool shown in FIG. 3, taken along the line 4—4 thereof, and looking in the direction of the arrows.

Referring now to the drawings, and in particular to FIGS. 3 and 4, the numeral 10 generally designates a finished and completely manufactured sliding valve spool, made in accordance with the principles of the present invention, and ready for use in a directional, reversing four-way flow control air valve. It will be understood that master valve spools for three-way air valves, two-way air valves, and the like, may also be made in accordance with the principles of the present invention.

Figure 1:
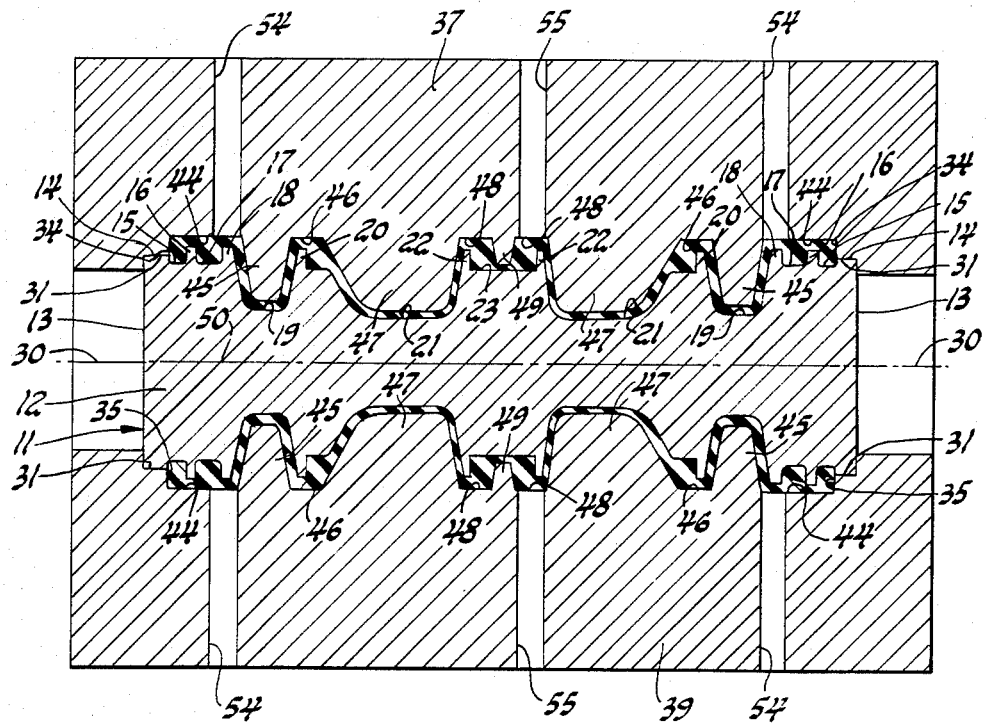
FIG. 1 is a cross section view of a sliding valve spool constructed in accordance with the present invention, and showing the valve spool disposed within a mold after an injection molding material has been injected into the mold cavity, between the mold and the valve spool shaft body.
Figure 2:
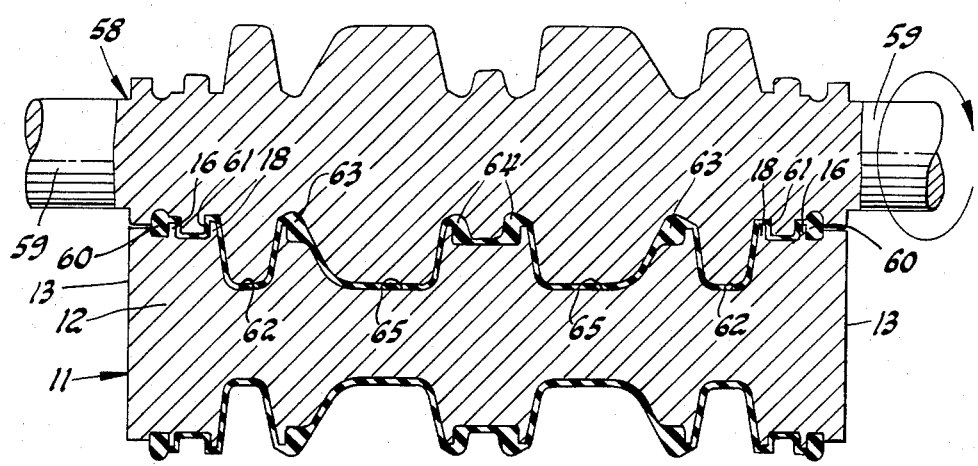
FIG. 2 is a cross sectional view of the molded valve spool of the present invention, and showing the simultaneous grinding of the annular valve members, the annular centering seals, and the annular pressure seal grooves.

The numeral 11 in FIGS. 1 and 2 generally designates the sliding valve spool of the present invention being processed through the molding operation and a grinding operation, respectively. The molded sliding valve spool, shown as being processed in FIGS. 1 and 2, includes an elongated, substantially cylindrical metal body 12 which is provided with transverse flat end faces 13. As shown in FIG. 1, the outer diameter of each end of the valve spool body 12 is indicated by the numeral 14. Spaced inwardly, and adjacent to each end 14 of the valve spool body 12, is a peripheral groove 15 for the reception of the molding material, to form a pair of annular centering end seals. Longitudinally spaced apart from each of the grooves 15, by an annular flange 16, is a peripheral groove 17 for the reception of the molding material for the forming of an annular pressure seal groove. Each of the grooves 17 is bounded on the inner side thereof by an annular flange 18, which has an outer diameter substantially equal to the outer diameter of the flange 16. Spaced longitudinally inward from each of the annular flanges 18 are a pair of deep grooves 19 and 21, between which is formed an annular flange 20. The inner side of each of the grooves 21 is bounded by an annular integral flange 22. A peripheral groove 23 is formed between the annular flange members 22, for the reception of molding material, and for forming a pair of spaced apart annular valve members, as described in detail hereinafter. Two other annular valve members are formed by the molding material formed over the outer peripheries of the annular flanges 20, as described in detail hereinafter.

In the method of making the sliding valve spool of the present invention, the last described workpiece body 12 is provided by any suitable metal manufacturing method as, for example, by casting the valve spool body 12 in the aforedescribed shape, or machining the aforedescribed metal body shape with an automatic screw machine, or the like. In the next step of making the valve spool 10 of the present invention, the aforedescribed valve spool body 12 would be enclosed in a pair of suitable mold members, such as the upper and lower mold members 37 and 39. The mold members 37 and 39 meet along the plane 30, which is on the same plane as the center line 50 of the valve spool body 12. As shown in FIG. 1, each end of the valve spool body 12 is seated in an annular recess formed in the inner end faces of the upper and lower movable mold members 37 and 39. The outer end diameters 14 of the valve spool body 12 are seated against the arcuate half-round surfaces 31 of the adjacent recess formed in the inner end faces of the mold members 37 and 39. The inner faces 34 and 35 of the mold members 37 and 39, respectively, form the cut-off point for the molding material at the junction with the outer diameter end portions 14 of the valve spool body 12.

It will be understood that the upper and lower mold members 37 and 39 would each have a semi-circular mold configuration or cavity formed on the lower and upper faces, respectively thereof, for forming a mold for the aforedescribed annular valve members, annular centering seal and annular pressure seal grooves about the valve spool body 12. As shown in FIG. 1, the upper and lower mold members 37 and 39 are each provided at the ends thereof with an inwardly formed groove around the inner periphery of the mold cavity, and which is indicated by the numeral 44 which is disposed opposite the annular centering seal and annular pressure seal positions on the valve spool body 12. A half-round groove 46 is formed on the internal surface of each of the mold cavities of the mold members 37 and 39, at a point spaced longitudinally inward from each of the outer end grooves 44, and it is separated therefrom by a radial arcuate flange 45 which is disposed around the inner periphery thereof, and which extends radially into the groove 19 in the valve spool body 12. A pair of longitudinally spaced apart radial projections 47 are formed around the inner arcuate periphery of each of the mold cavities in the upper and lower mold members 37 and 39, and they extend into the grooves 21 formed around the periphery of the valve spool body 12. A longitudinal, inwardly disposed arcuate groove 48 is formed along the inner side of each of the semi-circular projections 47, and they are each indicated by the numerals 48, and they are divided by a peripheral semi-circular flange 49 which extends radially into the groove 23 on the valve spool body 12.

The valve spool body 12 is positioned within the aforedescribed upper and lower mold members 37 and 39, in such a manner that minimum air spaces exist between the valve spool body end diameters 14 and the aforedescribed illustrative mold members.

After the valve spool body 12 has been enclosed in the mold members 37 and 39, the cylindrical cavity formed between the shaped peripheral or cylindrical surface of the valve spool body 12, and the mating internal surfaces of the mold members 37 and 39, is filled with a suitable molding material in its fluid state through a plurality of injection mold feeder bores 54, in a well-known fashion. Each of the numerals 55 indicates a vent bore. The molding material is allowed to cure, and it becomes rigid and machinable. The molding material employed may be any suitable elastomeric material as, for example, a suitable rubber material of the type used in making conventional pressure seals and the like.

After the molding material has cured, the movable mold members 37 and 39 are withdrawn from the valve spool body 12, and the outer surface of the molded material, as illustrated in FIG. 1, is then ready for a simultaneous grinding operation, as illustrated in FIG. 2.

The numeral 58 in FIG. 2 generally designates an elongated cylindrical grinding wheel, which has an outer shape identical to the final exterior form of the finished valve 10 shown in FIG. 3. The grinding wheel 58 would be carried on a pair of rotatable end shafts 59, and the valve spool body 12 would be supported to rotate in the opposite direction, simultaneously with the grinding wheel 58, about its longitudinal axis, which would be parallel to the longitudinal axis of the grinding wheel 58. The grinding wheel 58 and the valve spool body 12 would be supported by any suitable conventional grinding machine structure. As shown in FIGS. 2 and 3, the grinding wheel 58 simultaneously grinds the final peripheral shape of the annular valve members 63 and 64, the peripheral shape of the annular centering end seals 60, and the shape of the annular pressure sea grooves 61. The grinding wheel 58 also simultaneously grinds the molding material between the annular valve members 63 and 64, and the annular pressure seal grooves 61, so as to remove molding flash from these areas of the finished valve spool 10. The simultaneous grinding of the annular pressure seal grooves 61 with the outer periphery of the annular centering seals 60 and the annular valve members 63 and 64 provides for accurate concentricity of these parts on the valve spool body 12, and the achievement of optimum size control. A closer tolerance is achieved, by the simultaneous grinding of the annular pressure seal grooves 61 with the annular centering seals 60 and the annular valve members 63 and 64, then when employing the prior art method of separately machining the annular pressure seal grooves in the outer periphery of the metal valve spool. For example, the diameter of the annular pressure seal grooves 61 can be held within 0.001", whereas when the annular pressure seal grooves are separately machined, a tolerance of only 0.002" or 0.003" is achievable. The outer peripheral diameter of the annular centering seals 60 and the annular valve members 63 and 64 are identical, for sliding in the valve spool bore of a valve, for operative engagement therewith. An annular pressure seal 68, is mounted in each of the annular grooves 61, and it is under a slight compression when the valve spool 10 is operatively mounted in a valve spool bore in a valve. The annular pressure seal 68 may be any suitable pressure seal, such as a U-cup seal, an O-ring seal, and the like.

The valve spool 10 of the present invention provides a valve spool which is stable, and which resists side loading of the valve spool, and yet provides for low break-away forces when the valve spool is moved in a valve spool bore.

Figure 5:
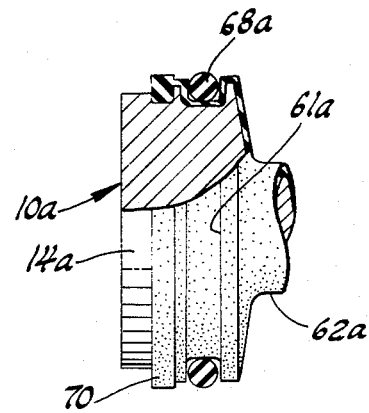
FIG. 5 is a fragmentary, elevational view of the left end of a sliding valve spool made in accordance with the principles of the present invention, and showing parts in section and parts broken away, and showing a first modified annular centering seal.

The annular centering seals 60 are illustrated in FIGS. 2 and 3 as having a rounded or convex peripheral form. FIG. 5 illustrates a modified annular centering seal 70 which has a flat peripheral surface. FIG. 5 shows one end of a modified sliding valve spool made in accordance with the principles of the present invention, and the parts thereof which are the same as the parts of the first embodiment illustrated in FIGS. 2 and 3 have been marked with the same reference numerals, followed by the small letter "a".

Figure 6:
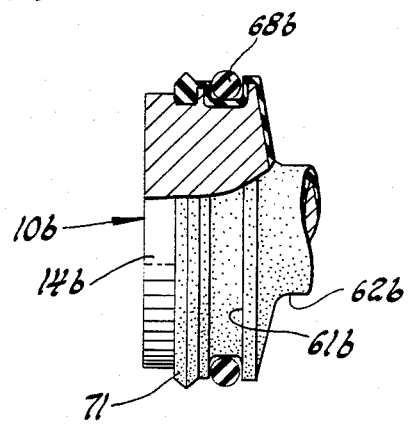
FIG. 6 is a view similar to FIG. 5, and showing a second modified annular centering seal.

FIG. 6 illustrates another embodiment of the invention wherein the parts of a modified valve spool which are the same as the parts of the valve spool 10, shown in FIGS. 2 and 3, have been marked with the same reference numerals, followed by the small letter "b". In the embodiment of FIG. 6, the annular centering seal 71 is illustrated as having a pointed or conical outer periphery.

The embodiments of FIGS. 5 and 6 would function in the same manner as the rounded surface embodiment of FIG. 3 in that they would function to engage the surface of a valve bore in which they are operatively mounted, to prevent side loading or sideward movement of the valve spool 10 as it is slidably moved between its operating positions in a valve main spool bore.

Figure 7:
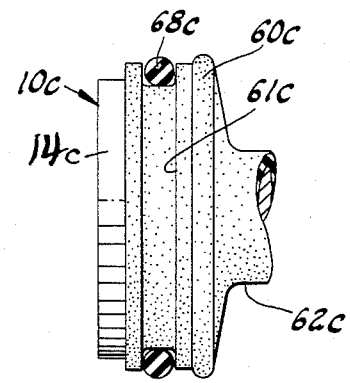
FIG. 7 is a fragmentary, elevational view of the left end of a sliding valve spool made in accordance with the principle of the present invention, and showing a modification of the invention in which the positions of the centering seal and pressure seal have been reversed.

FIG. 7 is a fragmentary, elevational view of the left end of a modified sliding valve spool embodiment made in accordance with the principles of the present invention, and showing the annular centering seal and annular pressure seal in reversed positions. The parts of the embodiment of FIG. 7 which are the same as the parts of the valve spool 10 of FIGS. 2 and 3 have been marked with the same reference numerals, followed by the small letter "c". FIG. 7 shows the annular pressure seal 68c disposed outboard of the annular centering seal 60c.

INDUSTRIAL APPLICABILITY

The improved sliding valve spool of the present invention is adapted for use in various type of directional, flow reversing control valves, such as four-way valves, three-way valves, two-way valves and the like, for controlling the direction of flow of pressurized air to and from various apparatuses, such as an air cylinder, an air brake, a press clutch, and the like.

I claim:
1. A sliding valve spool for an air valve characterized in that it comprises:
   (a) an elongated valve spool body having an inner and an outer peripheral groove on each end thereof, and a plurality of longitudinally spaced apart integral intermediate annular valve flanges to form a one-piece construction body;
   (b) said valve spool body having an integral elastomeric material molded thereon, around the periphery thereof, and said integral elastomeric material including an annular centering seal molded in one of each of said inner and outer peripheral grooves at each end of the valve body, and an annular valve member is molded around each of said plurality of integral annular valve flanges, and said molded integral elastomeric material extends around the periphery of the valve spool one-piece construction body over the other of each of said inner and outer peripheral grooves and between each of said annular centering seals and the integral annular valve members; and,
   (c) each of the elastomeric annular centering seals and annular valve members are of equal diameter, and an annular pressure seal groove is formed in the molded material, at each end of the valve spool body, in the other one of each of said inner and outer peripheral grooves, and an annular pressure seal is mounted in each annular pressure seal groove.

2. A sliding valve spool for an air valve as defined in claim 1 characterized in that:
   (a) the outer periphery of each of the annular valve members and each of the annular centering seals is formed with a convex cross section shape.

3. A sliding valve spool for an air valve, as defined in claim 1, characterized in that:
   (a) the outer periphery of each of the annular valve members and each of the annular centering seals wear rings is formed with a flat cross section shape.

4. A sliding valve spool for an air valve, as defined in claim 1, characterized in that:
   (a) the outer periphery of each of the annular valve members and each of the annular centering seals is formed with a conical cross section shape.

5. A sliding valve spool for an air valve, as defined in any one of claims 1, 2, 3 or 4, characterized in that:
   (a) the annular centering seal at each end of the valve spool is disposed longitudinally outboard of the adjacent annular pressure seal.

6. A sliding valve spool for an air valve, as defined in any one of claims 1, 2, 3 or 4 characterized in that:
   (a) the annular centering seal at each end of the valve spool is disposed longitudinally inboard of the adjacent annular pressure seal.

* * * * *